United States Patent
Ma (10) Patent No.: US 9,702,348 B2
(45) Date of Patent: Jul. 11, 2017

(54) CHEMICAL LOOPING FLUIDIZED-BED CONCENTRATING SOLAR POWER SYSTEM AND METHOD

(71) Applicant: Alliance for Sustainable Energy, LLC, Golden, CO (US)

(72) Inventor: Zhiwen Ma, Golden, CO (US)

( * ) Notice: Subject to any disclaimer, the term of this patent is extended or adjusted under 35 U.S.C. 154(b) by 442 days.

(21) Appl. No.: 14/243,775

(22) Filed: Apr. 2, 2014

(65) Prior Publication Data
US 2014/0298822 A1    Oct. 9, 2014

Related U.S. Application Data (60) Provisional application No. 61/807,982, filed on Apr. 3, 2013.

(51) Int. Cl.
*F03G 6/06* (2006.01)
*F01K 23/06* (2006.01)
(Continued)

(52) U.S. Cl.
CPC ............ *F03G 6/067* (2013.01); *C01B 13/08* (2013.01); *F01K 23/06* (2013.01); *F03G 6/064* (2013.01);
(Continued)

(58) Field of Classification Search
CPC .......... F03G 6/064; F03G 6/065; F03G 6/067; F01K 23/06; F01K 23/10; F01K 23/08;
(Continued)

(56) References Cited

U.S. PATENT DOCUMENTS

| 1,165,586 A | 12/1915 | Fraser et al. |
| 1,338,484 A | 4/1920 | Baker |

(Continued)

FOREIGN PATENT DOCUMENTS

| FR | 2 250 367 A5 | 5/1975 |
| SU | 903486 A1 | 2/1982 |

(Continued)

OTHER PUBLICATIONS

Julich Solar Tower Power Plant, http://www.dlr.de/en/desktopdefault.aspx/tabid-5105/8598_read-19289.
(Continued)

*Primary Examiner* — Pascal M Bui Pho
*Assistant Examiner* — Alain Chau (57) ABSTRACT

A concentrated solar power (CSP) plant comprises a receiver configured to contain a chemical substance for a chemical reaction and an array of heliostats. Each heliostat is configured to direct sunlight toward the receiver. The receiver is configured to transfer thermal energy from the sunlight to the chemical substance in a reduction reaction. The CSP plant further comprises a first storage container configured to store solid state particles produced by the reduction reaction and a heat exchanger configured to combine the solid state particles and gas through an oxidation reaction. The heat exchanger is configured to transfer heat produced in the oxidation reaction to a working fluid to heat the working fluid. The CSP plant further comprises a power turbine coupled to the heat exchanger, such that the heated working fluid turns the power turbine, and a generator coupled to and driven by the power turbine to generate electricity.

4 Claims, 5 Drawing Sheets

(51) Int. Cl.
*C01B 13/08* (2006.01)
*F28D 20/00* (2006.01)

(52) U.S. Cl.
CPC ............ *F28D 20/003* (2013.01); *Y02E 10/41* (2013.01); *Y02E 10/46* (2013.01); *Y02E 60/142* (2013.01)

(58) Field of Classification Search
CPC ....... F01K 3/188; Y02E 20/16; Y02E 60/142; Y02E 10/41; Y02E 10/46; C10J 3/725; F28D 20/003; C10B 13/08
USPC ..................... 60/39.182, 655, 641.8–641.15
See application file for complete search history.

(56) References Cited

U.S. PATENT DOCUMENTS

| | | | |
|---|---|---|---|
| 1,447,421 A | 3/1923 | Kircher | |
| 2,501,951 A | 3/1950 | Lintz | |
| 2,958,983 A | 11/1960 | Hoover | |
| 3,241,278 A | 3/1966 | Magers, Jr. | |
| 3,419,047 A | 12/1968 | Osweiler | |
| 4,030,477 A | 6/1977 | Smith | |
| 4,031,685 A | 6/1977 | Heinz | |
| 4,069,642 A | 1/1978 | Hendriks | |
| 4,116,222 A | 9/1978 | Seifried | |
| 4,117,829 A | 10/1978 | Gross et al. | |
| 4,161,657 A * | 7/1979 | Shaffer, Jr. | F02B 43/08 136/248 |
| 4,192,371 A * | 3/1980 | Derouette | B01J 19/127 126/263.01 |
| 4,287,881 A | 9/1981 | Palazzetti et al. | |
| 4,314,549 A | 2/1982 | Swanson | |
| 4,333,445 A | 6/1982 | Lee | |
| 4,338,919 A | 7/1982 | Hwang | |
| 4,489,528 A | 12/1984 | Tolliver | |
| 4,727,930 A * | 3/1988 | Bruckner | F02C 1/05 165/104.17 |
| 4,979,992 A | 12/1990 | Bache | |
| 5,093,065 A | 3/1992 | Creedon | |
| 5,245,986 A | 9/1993 | Karni | |
| 5,417,052 A * | 5/1995 | Bharathan | F03G 6/064 165/104.19 |
| 5,447,024 A * | 9/1995 | Ishida | F01K 3/188 60/39.461 |
| 5,947,114 A | 9/1999 | Kribus et al. | |
| 6,012,874 A | 1/2000 | Groneck et al. | |
| 6,872,378 B2 | 3/2005 | Weimer et al. | |
| 7,954,321 B2 | 6/2011 | Shinnar | |
| 7,987,844 B2 | 8/2011 | Zillmer et al. | |
| 2001/0011069 A1 | 8/2001 | Hayes | |
| 2005/0279095 A1* | 12/2005 | Goldman | F01K 13/00 60/641.8 |
| 2006/0137282 A1 | 6/2006 | Anvick et al. | |
| 2007/0048095 A1 | 3/2007 | Chapman et al. | |
| 2007/0269273 A1 | 11/2007 | Henderson | |
| 2008/0019903 A1* | 1/2008 | Wegner | B01J 4/002 423/657 |
| 2008/0086946 A1* | 4/2008 | Weimer | B01J 19/127 48/89 |
| 2009/0194097 A1 | 8/2009 | Rabinoff | |
| 2009/0277443 A1 | 11/2009 | Jukkola et al. | |
| 2010/0263832 A1* | 10/2010 | Dalla Betta | F01K 3/12 165/104.12 |
| 2010/0303692 A1 | 12/2010 | Perkins et al. | |
| 2010/0314509 A1 | 12/2010 | Conger | |
| 2011/0067398 A1 | 3/2011 | Slocum et al. | |
| 2011/0067690 A1 | 3/2011 | Slocum et al. | |
| 2011/0094226 A1* | 4/2011 | McHugh | F01K 23/064 60/645 |
| 2011/0209475 A1* | 9/2011 | Jeter | F24J 2/07 60/641.11 |
| 2011/0239651 A1 | 10/2011 | Aoyama et al. | |
| 2011/0259544 A1 | 10/2011 | Neti et al. | |
| 2011/0314813 A1 | 12/2011 | Cafri et al. | |
| 2012/0216536 A1 | 8/2012 | Ma et al. | |
| 2013/0025192 A1 | 1/2013 | Wegeng et al. | |
| 2013/0255667 A1 | 10/2013 | Ma et al. | |
| 2013/0257056 A1 | 10/2013 | Ma | |
| 2013/0284163 A1 | 10/2013 | Flamant et al. | |
| 2014/0026883 A1 | 1/2014 | Chen | |
| 2014/0102912 A1* | 4/2014 | Palumbo | C01B 3/063 205/340 |

FOREIGN PATENT DOCUMENTS

| | | | | |
|---|---|---|---|---|
| WO | | 2010029411 A2 | 3/2010 | |
| WO | WO | 2010037011 A2 * | 4/2010 | ............... C10J 3/12 |
| WO | | 2010144554 A1 | 12/2010 | |

OTHER PUBLICATIONS

Agrafiotis, C., et al., "Evaluation of porous silicon carbide monolithic honeycombs as volumetric receivers/collectors of concentrated solar radiation," Solar Energy Materials & Solar Cells, vol. 91, Issue 6, Mar. 23, 2007, pp. 474-488.

Gil, A. et al., "Stare of the art on high temperature thermal energy storage for power generation. Part 1—Concepts, and modellization," Renewable and Sustainable Energy Reviews, vol. 14, Issue 1, Jan. 2010, pp. 31-35.

Wu, W., et al., "Direct Absorption Receivers for High Temperatures," URL: http://elib.dir.de/73113/1/SolarPACES2011_WU_DLR.pdf. last accessed Apr. 1, 2013

Siegel, N. et al.,"Development and Evaluation of a Prototype Solid Particle Receiver: On-Sun Testing Model and Validation," Journal of Solar Engineering,vol. 132, Issue 2, May 2010, pp. 021008-1-021008-8.

Roger, M. et al., "Face-Down Solid Particle Receiver Using Recirculation," Journal of Solar Energy Engineering, vol. 133, Issue 3, Aug. 2011, pp. 031009-1-031009-8.

Kunii, D., et al. Fluidization Engineering, 2nd Edition, 1991 by Butterwith-Heinemann, a division of Reed Publishing (USA), Chapter 13, pp. 313-323.

Martin, J., "ASCUAS: A Solar Central Receiver Utilizing a Solid Thermal Carrier," SAND82-8203, Unlimited Release, Printed Jan. 1982.

Kim, K. et al., "A study of solid particle flow characterization in solar particle receiver," Solar Energy, vol. 83, Issue 10, Oct. 2009, pp. 1784-1793.

Siegel, N., et al., "Design and On-Sun Testing of a Solid Particle Receiver Prototype," Proceedings of ES2008, Energy Sustainability 2008, Aug. 10-14, 2008, Jacksonville, FL USA.

Ma, Z. et al., "Thermal Energy Storage and Its Potential Applications in Solar Thermal Power Plants and Electricity Storage," Proceedings of the ASME 2011 5th International Conference on Energy Sustainability ES2011, Aug. 7-10, 2011, Washington, DC, USA.

Golob, M. et al., "Heat Transfor Coefficient Between Flat Surface and Sand," Proceedings of the ASME 2011 5th International Conference on Energy Sustainability ES2011, Aug. 7-10, 2011, Washington, DC, USA.

Neber, M., "Enhanced Solar Energy Harvest for Power Generation From Brayton Cycle," Proceedings of the ASME International Mechanical Engineering Congress and Exposition, IMECE2011, Nov. 11-17, 2011, Denver, CO, USA.

Kolb, G., "An Evaluation of Possible Next-Generation High-Temperature Molten-Salt Power Towers," Sandia Report SAND2011-9320, Unlimited Release, printed Dec. 2011.

Siegel, R. et al., "Thermal Radiation Heat Transfer," 3rd Edition 1992, 1981, 1972 by Hemisphere Publishing Corporation, pp. 292-297.

Hischier, I. et al., "A Modular Ceramic Cavity-Receiver for High-Temperature High-Concentration Solar Applications," Journal of Solar Energy Engineering, vol. 134, Issue 1, Feb. 2012, pp. 011004-1-011004-6.

(56) References Cited

OTHER PUBLICATIONS

Avial-Marin, A., "Volumetric receivers in Solar Thermal Power Plants with Central Receiver System technology: A review," Solar Energy, vol. 85, Issue 5, May 2011, pp. 891-910.
Foster Wheeler Corp. http://www.fwc.com/GlobalPlwerGroup/SteamGenerators/CirculatingFluidizedBed.cfm, last accessed Apr. 1, 2013.
Contech Systems Ltd., "Introduction to Micropile Design 101," Presentation for Arizona Ram Jack Seminar, Jan. 15, 2010.
Steinfeld, A. et al., "Thermochemical Production of Fuels with Concentrated Solar Energy," Optics Express vol. 18, No. S1, Apr. 26, 2010, pp. A100-A111.
Tamuara, Y., "Converstion of Concentrated Solar Thermal Energy into Chemical Energy," Royal Swedish Academy of Sciences, 2012, pp. 108-111.
Wong, B. et al., "Sulfur Based Thermochemical Energy Storage for Concentrated Solar Power," SolarPACES 2012, Sep. 11-14, 2012, Marrakech, Morocco.
Glatzmaier, G., "Summary Report for Concentrating Solar Power Thermal Storage Workshop," Technical Report NREL/TP-5500-52134, Aug. 2011.
SunShot, U.S. Dept. of Energy, "Particle Receiver Integrated with Fluidized Bed," Website www.solar.energy.gov/sunshot/csp.html, Sep. 2012.
"Thermochemical Heat Storage for Concentrated Solar Power: Thermochemical System Reactor Design for Thermal Energy Storage," Phase II Final Report for the period Sep. 30, 2008 through Apr. 30, 2011, prepared for the U.S. Dept. of Energy by Project Staff of General Atomics, Oct. 2011.
Kavidass, et al., "Why Build a Circulating Fluidized Bed Boiler to General Steam and Electric Power, " presented to POWER-GEN Asia 2000, Sep. 20-22, 2000, Bangkok, Thailand.
"Thermochemical Heat Storage for Concentrated Solar Power Based on Multivalent Metal Oxides," General Atomics, German Aerospace Center Staff, CSP Program Review, May 18, 2011.
"Energy Basics: Power Tower Systems for Concentrating Solar Power," U.S Dept. of Energy, Website www.eere.energy.gov/basics/renewable_energy/power_tower.html, Feb. 28, 2013.
Muller-Steinhagen, H. et al., "Concentrating Solar Power: A Review of the Technology," Quarterly of the Roayl Academy of Engineering, Ingenia 18, Feb./Mar. 2004, pp. 43-50.
Taylan, O. et al., "Fuel Production Using concentrated Solar Energy," Application of Solar Energy, 2013, pp. 33-67.
Portaspana, J. "High Temperature Thermal Energy Storage Systems Based on Latent and Thermo-Chemical Heat Storage," Master Thesis, Submitted in the Technishcen Universtiat Wien Faculty of Mechanical and Industrial Engineering, Jul. 2011, Vienna, Austria.
Steinfeld, A. "Solar Thermochemical Production of Hydrogen-A Review," Solar Energy, vol. 78, Isssue 5, May 2005, pp. 603-615.
Meier, A. et al., "Solar Fuels from Concentrated Sunlight," IEA SolarPACES Implementing Agreement, Aug. 2009.
Wong, "Lessons Learned: Developing Thermochemical Cycles for Solar Heat Storage Applications," Workshop on TES for CSP, Jan. 8, 2013.
"Circulating Fluidized-Bed (CFB) Boiler," CLECO, http://www.cleco.com/uploadsfTech_Diagram.pdf, date unknown.
"Solar Power Tower", Office of Energy Efficiency & Renewable Energy, http://www.eere.energy.gov/basics/renewable_energy/power_tower.html?print, date unknown.
"Building a Circular Silo", http://mathcentral.uregina.ca/QQ/database/QQ.09.00/natasha1.html, Aug. 19, 2002, Math Central via Wayback Machine, pp. 1-2.
"Micropiles (Minipiles)", http://haywardbaker.com/WhatWeDo/Techniques/StructuralSupport/Micropiles/default.aspx?prt=1, last accessed Sep. 7, 2016, pp. 1-2.

\* cited by examiner

FIG. 5

CHEMICAL LOOPING FLUIDIZED-BED CONCENTRATING SOLAR POWER SYSTEM AND METHOD

CROSS-REFERENCE TO RELATED APPLICATIONS

This application claims priority to, and the benefit of, U.S. Provisional Application No. 61/807,982, entitled "CHEMICAL LOOPING FLUIDIZED-BED CONCENTRATING SOLAR POWER SYSTEM AND METHOD" filed on Apr. 3, 2013, which is incorporated herein by reference in its entirety.

This application is also related to the following applications which are each incorporated by reference in their entirety:

U.S. patent application Ser. No. 13/855,088, entitled "METHODS AND SYSTEMS FOR CONCENTRATED SOLAR POWER", filed on Apr. 2, 2013, which is incorporated herein by reference in its entirety;

U.S. Provisional Application No. 61/715,747, entitled "Solid Particle Thermal Energy Storage Design for a Fluidized-Bed Concentrating Solar Power Plant", filed Oct. 18, 2012, which is incorporated herein by reference in its entirety;

U.S. Provisional Application No. 61/715,751, entitled "Fluidized-Bed Heat Exchanger Designs for Different Power Cycle in Power Tower Concentrating Solar Power Plant with Particle Receiver and Solid Thermal Energy Storage", filed Oct. 18, 2012, which is incorporated herein by reference in its entirety; and U.S. Provisional Application No. 61/715,755, entitled "Enclosed Particle Receiver Design for a Fluidized Bed in Power Tower Concentrating Solar Power Plant", filed Oct. 18, 2012, which is incorporated herein by reference in its entirety.

Embodiments encompassing combinations of those described herein with those described in the incorporated references are expressly contemplated as being within the scope of the present application.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Concentrating Solar Power (CSP) systems utilize solar energy to drive a thermal power cycle for the generation of electricity. CSP technologies include parabolic trough, linear Fresnel, central receiver or "power tower", and dish/engine systems. Considerable interest in CSP has been driven by renewable energy portfolio standards applicable to energy providers in the southwestern United States and renewable energy feed-in tariffs in Spain. CSP systems are typically deployed as large, centralized power plants to take advantage of economies of scale. However, current salt-based CSP systems face challenges, such as a loss of thermal energy through heat dissipation when stored and large footprints.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Method and systems for generating electricity are provided. In one embodiment, a concentrated solar power plant comprises a receiver configured to contain a chemical substance for a chemical reaction and an array of heliostats. Each heliostat is configured to direct sunlight toward the receiver. The receiver is configured to transfer thermal energy from the sunlight to the chemical substance in a reduction reaction. The CSP plant further comprises a first storage container configured to store solid state particles produced by the reduction reaction and a heat exchanger configured to combine the solid state particles and gas through an oxidation reaction. The heat exchanger is configured to transfer heat produced in the oxidation reaction to a working fluid to heat the working fluid. The CSP plant further comprises a power turbine coupled to the heat exchanger, such that the heated working fluid turns the power turbine, and a generator coupled to and driven by the power turbine to generate electricity.

In addition to the exemplary aspects and embodiments described above, further aspects and embodiments will be become apparent by reference to the drawings and by study of the following descriptions.

DRAWINGS

Exemplary embodiments are illustrated in referenced figures of the drawings. It is intended that the embodiments and figures disclosed herein are to be considered illustrative rather than limiting.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described herein include a chemical looping system that collects and converts solar energy into thermal/chemical energy within a solar receiver for a plurality of chemical agents. The thermal/chemical energy is then stored in a thermochemical energy storage container. The stored thermal/chemical energy is released in a fluidized bed heat exchanger for power generation. Thus, the embodiments described herein provide a platform for solar energy collection, storage, and power generation in achieving a high-performance, low cost CSP system compared to conventional systems.

Figure 1:
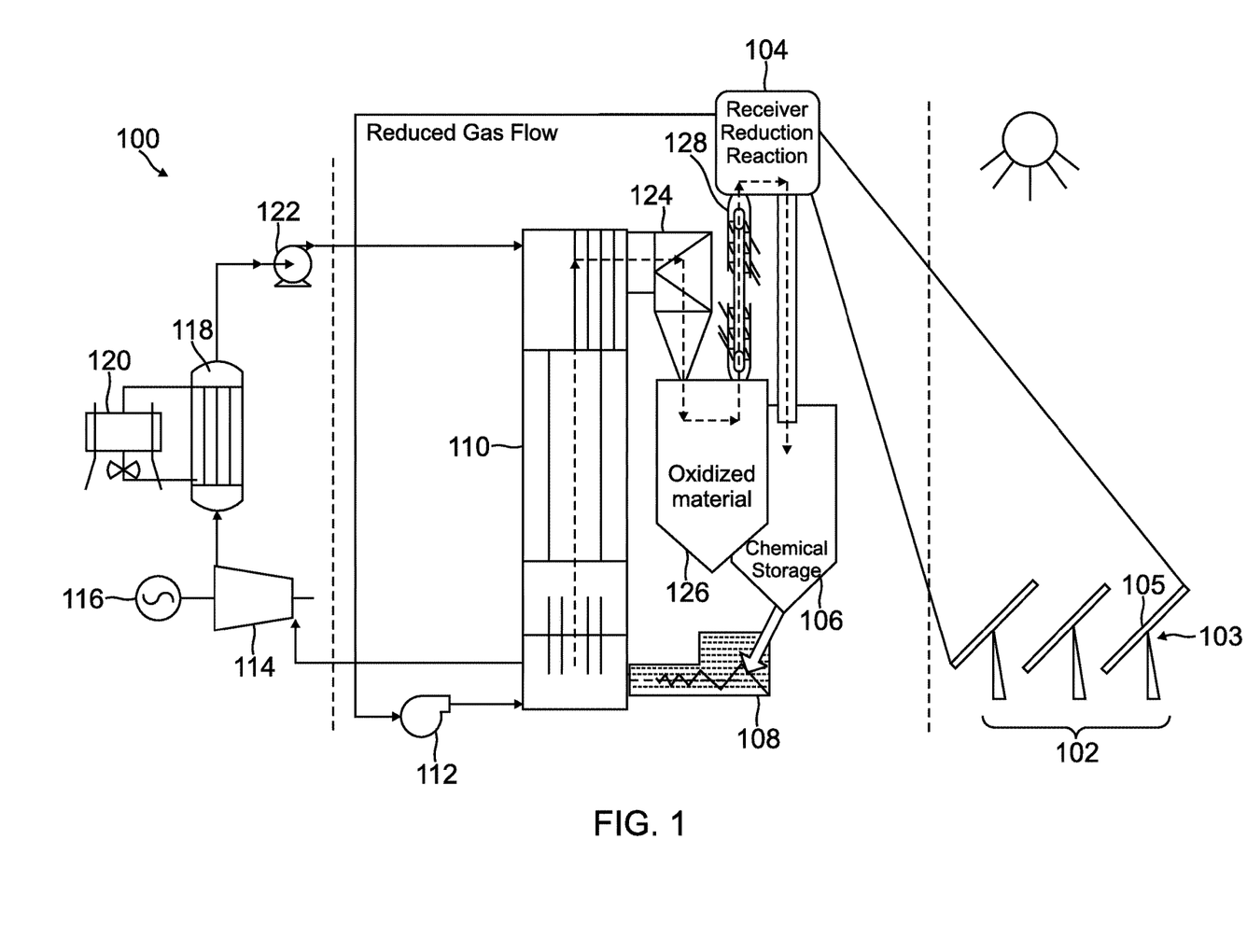
FIG. 1 is a block diagram of one embodiment of an exemplary chemical looping fluidized-bed concentrating solar power system.

FIG. 1 is a block diagram of one embodiment of a chemical looping fluidized-bed concentrating solar power system (FB-CSP) 100. System 100 includes an array 102 of heliostats 103. Each heliostat 103 includes a mirror 105 which reflects light from the sun toward a receiver 104. In addition, each heliostat 103 is configured to turn its respective mirror 105 to compensate for the apparent motion of the sun in the sky due to the rotation of the earth. In this way, each respective mirror 105 continues to reflect sunlight toward the receiver 104 as the position of the sun in the sky changes.

The combined sunlight reflected from the plurality of heliostats 103 in the array 102 provides temperatures of approximately 500-1500° C. at the receiver 104. The receiver 104 is configured to hold chemical substances for a chemical reaction and to transfer heat from the reflected sunlight to the chemical substances. An exemplary receiver which can be implemented in system 100 is described in more detail in co-pending U.S. patent application Ser. No. 13/855,088.

In the system 100, the heat from the reflected sunlight is used to drive a reduction reaction of the chemical substances in the receiver 104. For example, in some embodiments, one or more metal oxides having relatively high reduction kinetics and oxidization conversion rates are used as the reactant in the receiver 104 for a reduction reaction. The determination of suitable metal oxides having the desired reduction kinetics and oxidization conversion rates is dependent on the specific reaction and can be based on activation energy and reaction steps. The metal oxide starts in a solid state in the receiver 104. The thermal energy from the reflected sunlight drives the reduction reaction to reduce the metal oxide to a metal and oxygen, as expressed in equation 1 below. In other words, the product of the reduction reaction can be viewed as a gain of electrons in the metal oxide or as a loss of oxygen atoms. Thus, the thermal energy is stored as chemical energy in the product of the reduction reaction.

$$Me_xO_y(s) \rightarrow Me_xO_{y-2}(s) + O_2(g) \quad (1)$$

The metal produced from the reduction reaction is stored in a storage container or silo 106. Thus, silo 106 stores the thermal energy from the reflected sunlight in chemical energy form. The chemical energy storage can serve long-term storage for days, months, or seasons. Additionally, storing the thermal energy in chemical energy form addresses day-to-day variation of renewable generation, and can shift generation from a low power demand season to a high-demand season to meet load and address renewable resource variation. For example, the generation can be shifted from idle weekend/holidays to weekdays and/or from season to season to satisfy grid demand through different seasons and periods.

Furthermore, the chemical energy storage provides other advantages over current salt-based FB-CSP systems. In particular, the chemical energy storage does not lose thermal energy through heat dissipation when stored as in the case of salt-based FB-CSP systems. In addition, the chemical energy storage is denser and can be stored more compactly than current salt-based systems. Thus, the footprint and cost of silos can be reduced for the chemical looping FB-CSP system as compared to current salt-based FB-CSP systems.

Metal from silo 106 is delivered via a conveyor 108 to a fluidized-bed heat exchanger 110 as needed. Additionally, the oxygen ($O_2$) gas from the reduction reaction in the receiver 104 is also delivered to the fluidized-bed heat exchanger 110 via a pump 112 which compresses the gas. The compressed gas is then combined with the metal from silo 106 in the heat exchanger 110 where the pressure of the compressed gas suspends the metal in the gas. Additionally, an oxidation reaction occurs with the mixture of oxygen and the metal which releases the stored chemical energy as heat. In some embodiments, the pressurized oxygen gas is stored until needed similar to the stored metal as discussed above. In other embodiments, the oxygen gas is not stored and oxygen from ambient air is used as needed for the oxidation reaction if sufficient oxygen from the reduction reaction is not available. Furthermore, in some embodiments, the oxidation reaction occurs spontaneously at low temperatures (e.g., ambient or room temperature). In other embodiments, the oxidation reaction involves a combustion process in which the metal/oxygen mixture is ignited to release the stored chemical energy. Equation 2 expresses the oxidation reaction of the metal and oxygen.

$$Me_xO_{y-2}(s) + O_2(g) \rightarrow Me_xO_y(s) \quad (2)$$

The heat that results from the oxidation reaction is transferred to a working fluid, such as but not limited to water or ammonia, in the heat exchanger 110. It is to be understood that, in other embodiments, other working fluids can be used. For example, other working fluids include, but are not limited to, hydrocarbons (e.g., butane, propane, propylene, etc.) and liquid fluorocarbons (e.g., tetrafluoroethane). The reduction product is in a solid particle state so that the system directly drives hot gas-solid two-phase flow through the boiler or heat exchanger 110 to heat the working fluid which reduces the need for an intermediate heat exchanger, such as oil-salt heat transfer in a trough plant, and expensive salt to working fluid heat exchangers as in a conventional salt-based CSP plant. The high temperature achieved by the particle receiver 104 and the high heat transfer rate of gas-solid flow in the heat exchanger 110 also minimizes the heat transfer area needed which can significantly reduce boiler or heat exchanger cost when compared to conventional salt-based CSP plants.

The heated working fluid is passed to a power turbine 114. The pressure of the heated working fluid turns the power turbine 114, which is coupled to and drives the generator 116 to produce electricity. For example, in some embodiments, the working fluid is vaporized and the power turbine is turned by the pressure of the vaporized working fluid. In other embodiments, the working fluid is not vaporized. For example, in some embodiments a super-critical carbon dioxide power cycle or an air-Brayton combined cycle is used. In such embodiments, no vaporization process is needed as the working fluid is in a gas or supercritical fluid condition.

After driving the power turbine 114, the heated working fluid is then expelled from the power turbine 114 and heat is removed from the working fluid. For example, in this exemplary embodiment involving a vaporized working fluid, the working fluid is condensed again in condenser 118. In particular, remaining heat from the vaporized working fluid is transferred to a cooler 120 coupled to the condenser 118. The removal of heat from the vaporized working fluid causes the working fluid to condense to a liquid state. However, in other embodiments, the working fluid is not condensed after being expelled from the power turbine 114.

Figure 3:
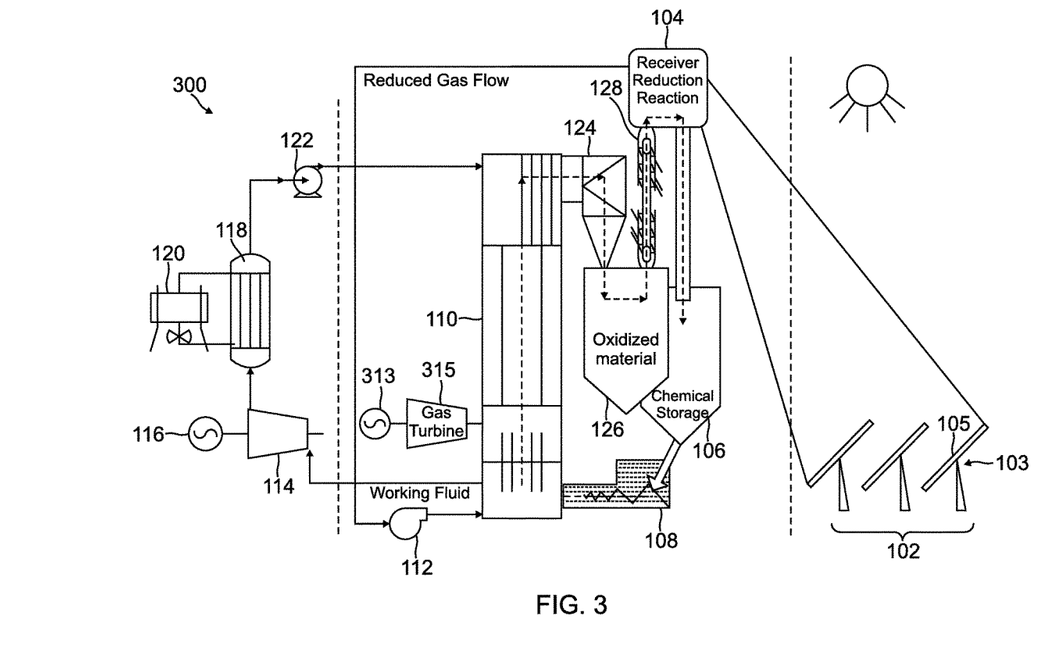
FIG. 3 is a block diagram of another embodiment of an exemplary chemical looping fluidized-bed concentrating solar power system.

A pump 122 is then used to move the working fluid back into the heat exchanger 110 where it is heated by the transfer of heat from the oxidation reaction occurring in the heat exchanger 110. In addition, in some embodiments, heated gas which results from the combustion of the metal/oxygen mixture is conducted to a gas turbine which is driven by the heated gas in a Brayton cycle or is used to heat a supercritical-carbon dioxide (CO2) working fluid from the oxidization reaction to drive a supercritical-CO2 Brayton power unit. An exemplary configuration of a chemical looping fluidized-bed concentrating solar power system 300 which includes a gas turbine 315 is shown in FIG. 3. The exemplary configuration shown in FIG. 3 is similar to the configuration of the system 100 with the addition of the gas turbine 315 and generator 313 coupled to the gas turbine 315.

The product of the oxidation reaction is then passed from the heat exchanger 110 to a cyclone 124. In the cyclone 124, the solid state particles (e.g., metal oxide particles) are separated from the gas particles. The metal oxide is then stored in a storage container or silo 126 for later use. An elevator or conveyer 128 then moves metal oxide as needed to the receiver 104 where it undergoes another reduction reaction as described above.

Figure 2:
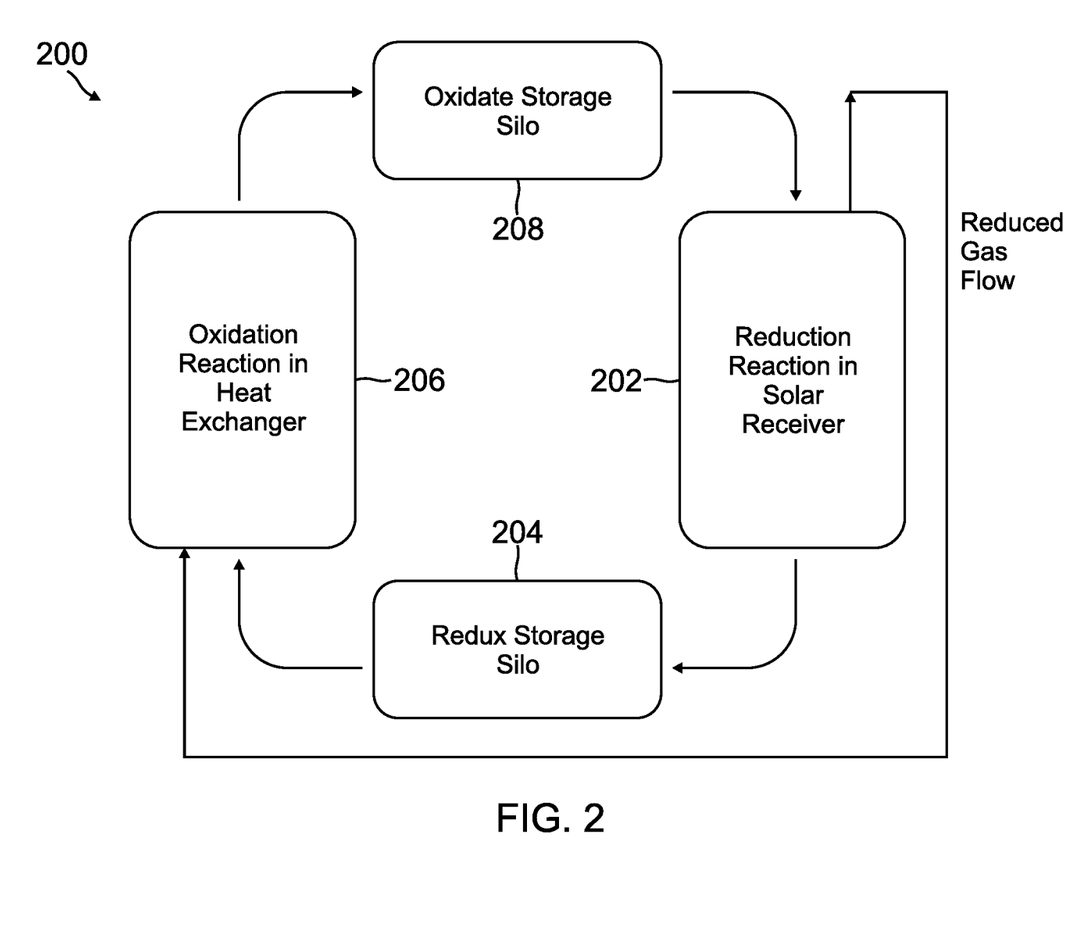
FIG. 2 is a flow chart of one embodiment of an exemplary closed loop energy conversion process used in an exemplary fluidized-bed concentrating solar power system.

The above energy conversion and storage cycle is graphically depicted in the exemplary flow chart 200 shown in FIG. 2. In particular, at block 202 a reduction reaction in the receiver reduces the metal oxide to convert the thermal energy to chemical energy. The metal product of the reduction reaction is stored in a first silo at block 204. At block 206, the gas product of the reduction reaction is combined with the metal product in an oxidation reaction in the heat exchanger to convert the chemical energy to thermal energy for use in heating a working fluid. The oxidated metal is then stored in a second silo at block 208. The oxidated metal is then returned to the receiver and the cycle then repeats at block 202.

Figure 4:
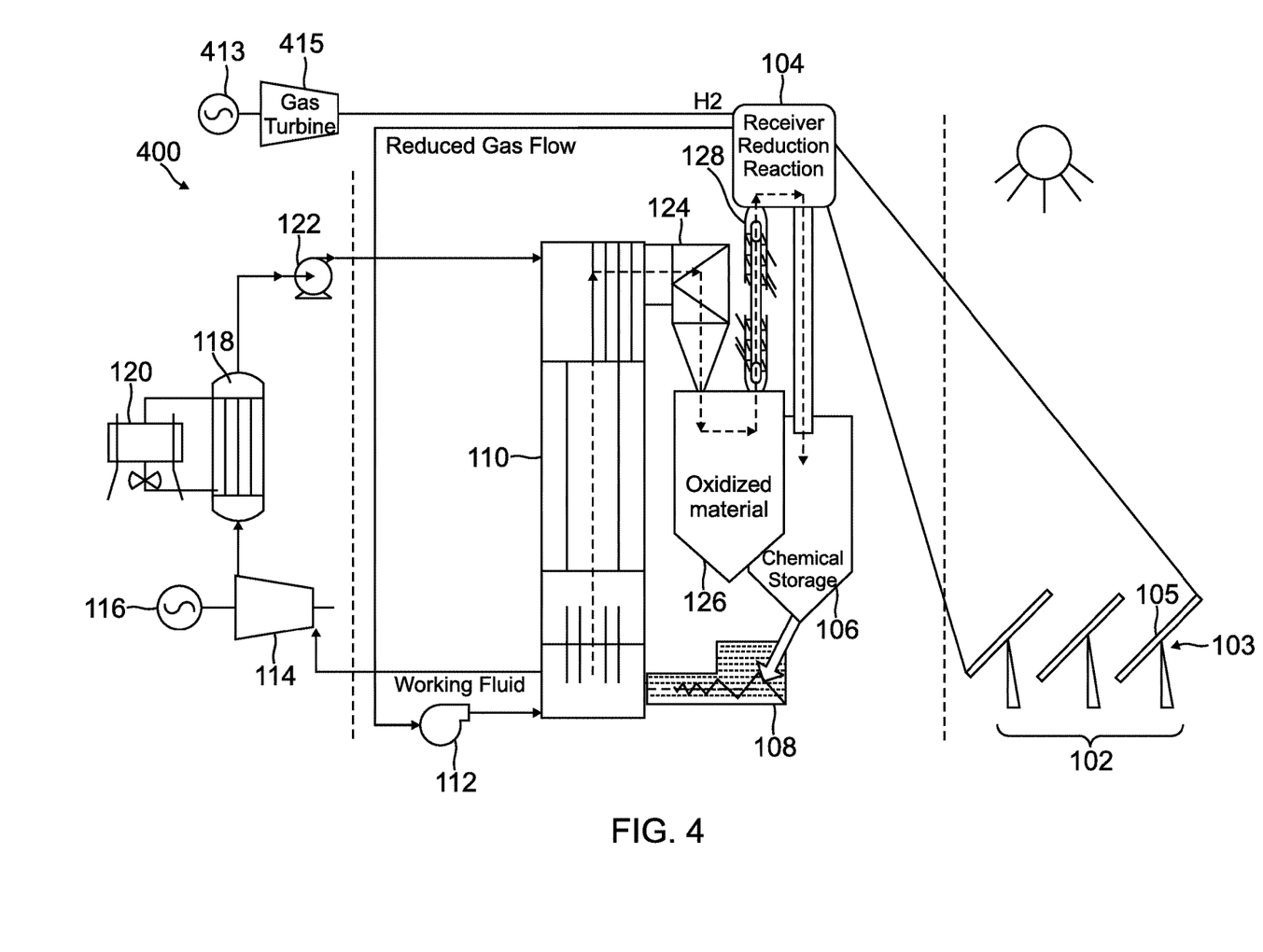
FIG. 4 is a block diagram of another embodiment of an exemplary chemical looping fluidized-bed concentrating solar power system.

Although the description above is directed at redox reactions of metal oxide, other chemical substances, such as other solid-particle chemical substances, can be used in other embodiments. In addition, system 100 is configured to accommodate other suitable chemical reactions. For example, other suitable chemical reactions include ammonia ($NH_3$) reactions, and sulfur cycling reactions. Additionally, in some embodiments, biofuel/biomass or natural gas is used as feedstock for $H_2$ generation, and $CO_2$ separation and sequestration can be performed with the relative technologies. The product from such a reaction is clean water that can be reused for reforming or plant cooling. Additionally, the high $H_2$ combustion temperature could significantly increase the power plant efficiency through a gas turbine/steam turbine combined cycle. In particular, hydrogen is mixed with oxygen, such as from ambient air, and then burned to drive a gas turbine as a top cycle, as shown in the example in FIG. 4. The heat from the combustion can also be used to vaporize or heat a working fluid and drive a vapor or steam turbine. In addition, $H_2$ originated from solar energy can be used in a high-efficiency (>40%) fuel cell for grid-scale or distributed electricity production.

The operations of a gas turbine as the top cycle and increased power generation efficiency reduce condensing water usage, which is usually a sensitive issue for the desert solar thermal plant. Additionally, high energy density chemical storage through $H_2$ reduces the storage tank foot print, tank size and potential cost as well. As used herein high energy density refers to energy density greater than typical levels of sensible heat and latent heat (e.g., greater than approximately 600 kJ/kg). The chemical looping FB-CSP also saves the cost of storage salt and the heat transfer fluid in the current salt based solar thermal system. Furthermore, the production of $H_2$ from solar thermal enables the ability to integrate with $H_2$ and fuel cell technology for clean power generation.

The heat absorption by a high heat flux reforming process can enable development of a more compact and highly efficient (e.g., greater than approximately 90%) receiver that is incorporated into the solar field. The use of solar thermal energy for solar fuel production separates the solar thermal collection from power generation. In other words, the solar thermal energy can be stored and used at a separate time for power generation so that a CSP plant can run at a constant base load with improved operating conditions and efficiency, thereby maintaining a high capacity factor except for regular plant maintenance. The current deployment of conventional salt-based CSP systems in the United States, for example, is more focused in the Southwest Sunbelt, where water is precious. However, due to its highly compact, efficient system with potentially low cost, the chemical looping FB-CSP system described herein has the potential to be used beyond the Southwest Sunbelt. For example, in the Southeast of the United States, reactions with biomass and reforming may be easier and economic to run. Thus, the chemical looping FB-CSP system described herein can enable the use of CSP beyond territories in the conventional current geological distributions.

Figure 5:
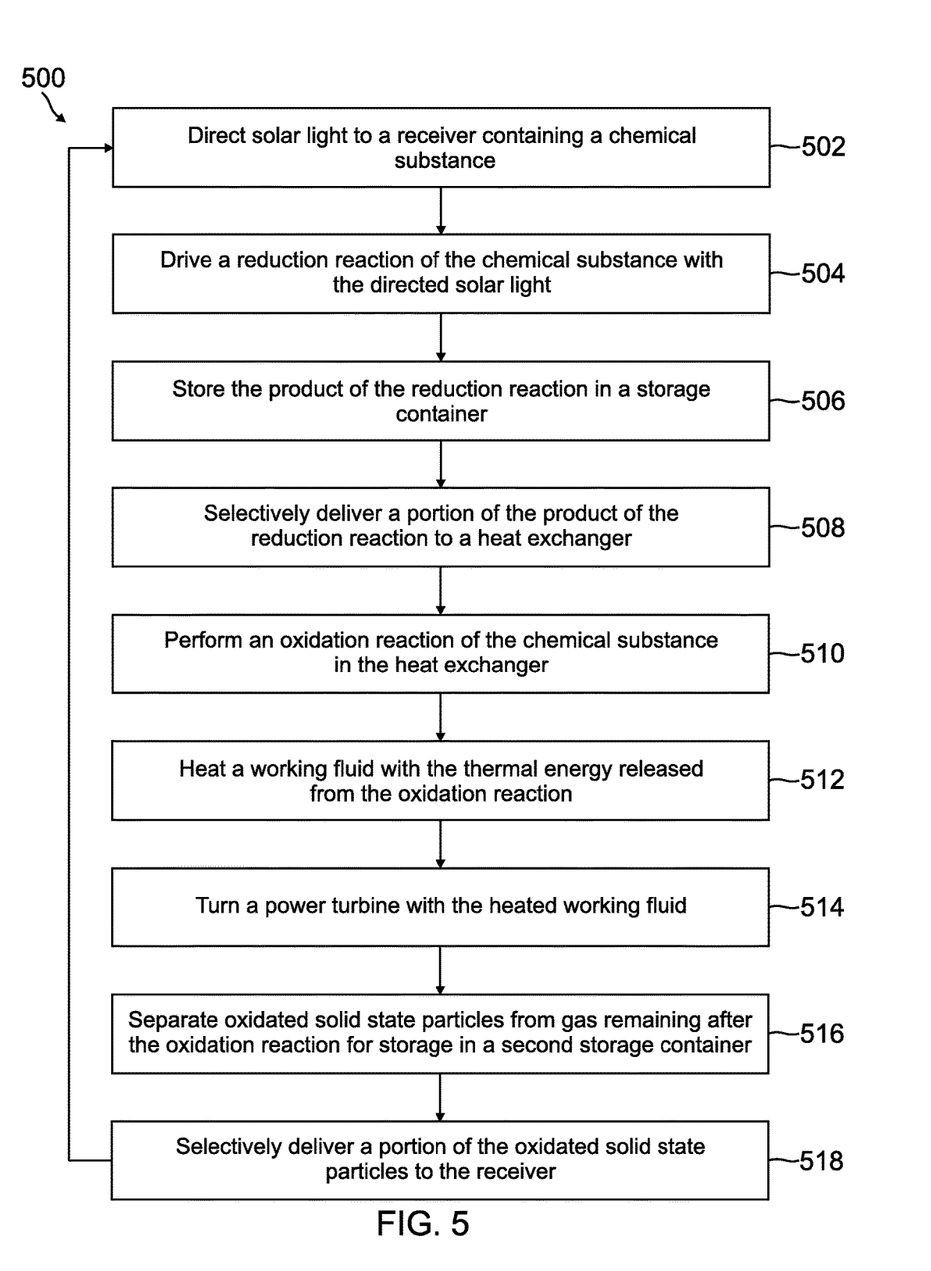
FIG. 5 is a flow chart depicting one embodiment of an exemplary method of generating electricity.

FIG. 5 is a flow chart of one embodiment of an exemplary method 500 of generating electricity. The method can be implemented in a chemical looping FB-CSP, such as systems 100, 300, or 400. At block 502, solar light is directed to a receiver, such as through the use of an array of heliostats, as discussed above. At block 504, a reduction reaction is driven with the directed solar light to reduce a chemical substance to solid state particles. For example, a metal oxide is reduced to a metal and oxygen. The solid state product of the reduction reaction is stored in a storage container at block 506. At block 508, at least a portion of the stored solid state particles is delivered to a heat exchanger.

At block 510, an oxidation reaction is performed with the solid state particles and a gas in the heat exchanger. In some embodiments, the gas used in the oxidation reaction is gas that is produced as a product of the reduction reaction. For example, the oxygen produced in the reduction of the metal oxide can be compressed and delivered to the heat exchanger as discussed above. The oxidation of the solid state particles produces oxidated solid state particles and releases thermal energy. In some embodiments, the oxidation reaction to release thermal energy occurs spontaneously at ambient temperature. In other embodiments, the solid state particles and gas are ignited to perform the oxidation reaction and release the thermal energy. In some such embodiments, the heated gas resulting from igniting the solid state particles and the gas is used to drive a gas turbine which is coupled to a second power generator to generate electricity. At block 512, the released thermal energy is transferred to a working fluid in the heat exchanger to heat the working fluid. At block 514, the heated working fluid turns a power turbine which is coupled to a power generator to generate electricity.

At block 516, the oxidated solid state particles are separated from the gas remaining after the oxidation reaction and stored in a second storage container. At block 518, the oxidated solid state particles are selectively delivered to the receiver for use in a subsequent reduction reaction driven by the directed solar light.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

What is claimed is:

1. A concentrating solar power plant comprising:
   a receiver containing a solid metal oxide (solid $Me_xO_y$), the receiver configured to receive thermal energy from sunlight and transfer the thermal energy to the solid $Me_xO_y$;
   a fluidized-bed heat exchanger containing a reduced solid metal oxide (solid $Me_xO_{y-2}$) and the solid $Me_xO_y$, the fluidized-bed heat exchanger configured to transfer heat from at least one of the solid $Me_xO_y$ or the solid $Me_xO_{y-2}$ to a working fluid in a working fluid circuit;
   a first gas that fluidizes the solid $Me_xO_y$ and the solid $Me_xO_{y-2}$ in the fluidized-bed heat exchanger;
   a first turbine fluidly coupled to the working fluid circuit; and
   a second turbine fluidly coupled to the fluidized-bed heat exchanger, wherein:
   the thermal energy from sunlight converts in the receiver at least a portion of the solid $Me_xO_y$ to the solid $Me_xO_{y-2}$ resulting in the storage of chemical energy in the solid $Me_xO_{y-2}$ and the formation of an oxygen ($O_2$) stream,
   at least a portion of the $O_2$ stream is delivered to the fluidized-bed heat exchanger to form at least a portion of the first gas, and is ignited and reacted with the solid $Me_xO_{y-2}$ in the fluidized-bed heat exchanger to convert at least a portion of the solid $Me_xO_{y-2}$ to the solid $Me_xO_y$ and a heated second gas,
   the conversion of the solid $Me_xO_{y-2}$ to the solid $Me_xO_y$ releases at least a portion of the chemical energy to form the heat transferred to the working fluid,
   the working fluid is directed to the first turbine such that the first turbine produces a first source of electricity, and
   the heated second gas is directed to the second turbine such that the second turbine produces a second source of electricity.

2. A method comprising:
   directing sunlight to a receiver containing a solid metal oxide (solid $Me_xO_y$);
   transferring thermal energy from the sunlight to the solid $Me_xO_y$ such that at least a portion of the solid $Me_xO_y$ is converted to oxygen ($O_2$) and a reduced solid metal oxide (solid $Me_xO_{y-2}$) containing stored chemical energy;
   in a fluidized-bed heat exchanger, fluidizing the solid $Me_xO_{y-2}$ with a first gas comprising $O_2$ produced in the transferring such that the fluidizing results in the igniting and reacting, in the fluidized-bed heat exchanger, of at least a portion of the solid $Me_xO_{y-2}$ with at least a portion of the $O_2$ produced in the transferring to form the solid $Me_xO_y$ and a heated second gas, such that the reacting results in the converting of a portion of the stored chemical energy to heat;
   transferring at least a portion of the heat to a working fluid to form a heated working fluid;
   generating a first portion of electricity by passing the heated working fluid through a first turbine; and
   directing the heated second gas through a second turbine resulting in the generating of a second portion of electricity.

3. The method of claim 2, further comprising:
   after the fluidizing, separating the second gas from the solid $Me_xO_y$;
   storing the separated solid $Me_xO_y$; and
   selectively delivering at least a portion of the separated solid $Me_xO_y$ to the receiver for the transferring of the thermal energy from the sunlight to the separated solid $Me_xO_y$.

4. The method of claim 2, further comprising:
   before the fluidizing, compressing the first gas; and
   delivering the compressed first gas to the fluidized-bed heat exchanger to perform the fluidizing.

* * * * *